United States Patent [19]

Nygaard

[11] 4,270,075

[45] May 26, 1981

[54] MOTOR ENERGIZED BY A DC VOLTAGE

[75] Inventor: Nils H. Nygaard, Sønderborg, Denmark

[73] Assignee: Danfoss A/S, Nordborg, Denmark

[21] Appl. No.: 52,936

[22] Filed: Jun. 28, 1979

[30] Foreign Application Priority Data

Jul. 6, 1978 [DE] Fed. Rep. of Germany ....... 2829685

[51] Int. Cl.³ .............................................. H02P 6/02
[52] U.S. Cl. .................................. 318/254; 318/138; 318/439
[58] Field of Search .................. 318/138, 254, 254 A, 318/439, 696

[56] References Cited

U.S. PATENT DOCUMENTS

| 3,684,934 | 8/1972 | Loyzim | 318/696 |
|---|---|---|---|
| 3,688,169 | 8/1972 | Yamaya et al. | 318/138 |
| 3,931,553 | 1/1976 | Stich et al. | 318/138 |
| 4,025,859 | 5/1977 | Smith | 318/138 |
| 4,081,736 | 3/1978 | Leenhouts et al. | 318/696 |

Primary Examiner—Stanley J. Witkowski
Assistant Examiner—John W. Redman
Attorney, Agent, or Firm—Wayne B. Easton

[57] ABSTRACT

The invention relates to a motor of the type energizable by a DC voltage and having at least two parallel stator winding branches with each branch having a stator winding in series with a controllable switching element. A demagnetization branch in parallel with each stator winding branch has an oppositely poled demagnetization winding inductively coupled to the associated stator winding and a series connected diode poled oppositely of the associated switching element. When one stator winding is switched off the voltage induced in the inductively coupled demagnetization winding produces a current which flows through the associated diode and the next simultaneously switched on stator winding. In this way the magnetic energy of the switched off stator winding is rapidly reduced and is utilized to supplement the magnetic field of the simultaneously switched on stator winding.

8 Claims, 5 Drawing Figures

MOTOR ENERGIZED BY A DC VOLTAGE

The invention relates to a motor energised by a DC voltage, comprising at least two alternately energised stator windings each in series with a controllable semi-conductor switching element, these first series circuits being connected in parallel to each other to the DC terminals and each stator winding being associated with a demagnetisation branch with a free-running diode connected oppositely to the pass direction of the semi-conductor switching element.

Motors of this kind are known. They possess a rotor with a two-pole permanent magnet and a stator with stamped out poles and two double-wound stator windings. Current is alternately fed to the stator windings by way of the controllable semi-conductor switching elements. The correct instant of changing over is determined by a sensor which detects the rotary position. Each semi-conductor switching element is bridged by a demagnetisation circuit containing the oppositely connected free-running diode.

Without the demagnetisation branch, when one stator winding is switched off a very large voltage opposed to the supply voltage is set up at the switched off winding as a result of the inductivity and it may damage the semi-conductor switching elements. However, by means of the demagnetisation branch a voltage can be induced in the respective other stator winding that causes a current to flow back to the voltage source by way of a free-running diode without the semi-conductor switching elements being subjected to an excessive voltage. However, this circuit is only suitable for motors with a two-phase winding. In addition, the build-up of the magnetic field produced by the newly connected stator winding is retarded.

It is also known to connect a free-running diode parallel to each stator winding. It forms a short-circuit path over which the winding current can continue to flow until the magnetic energy stored in the coil during the conductive period of the semi-conductor switching element has been reduced by losses within the stator winding. The result of this is that the magnetic flux is maintained for a prolonged period after the semi-conductor switching element has beenswitched off and it brakes the motor or stops it from turning altogether. Although one can reduce this period and thus the braking effect by connecting the free-running diode to an ohmic resistance, the magnetic energy is again converted to power loss.

The invention is based on the problem of providing a motor of the aforementioned kind in which the stator windings can also be connected in three or more phases and in which it is possible notionly very rapidly and with little loss to reduce the magnetic energy stored in the stator winding after switching off but also to assist the build-up of the magnetic field to be produced by the stator winding that is switched on.

This problem is solved according to the invention in that the demagnetisation branches consist of second series circuits which are in parallel with the first series circuits and each comprise a free-running diode and a demagnetisation winding which is inductively coupled to the associated stator winding and wound oppositely thereto.

In this motor, when a stator winding is switched off, a voltage is produced in the associated demagnetisation winding which permits a current to flow through this demagnetisation winding, the associated free-running diode, a semi-conductor switching element brought to the conductive condition and the stator winding switched thereby. In this way the magnetic energy of the switched-off stator winding is very rapidly reduced. It is not suppressed but utilised for maintaining or even building up the magnetic field of the stator winding that has just been switched on. Feed-back of the current to the voltage source is generally entirely or for the most part superfluous. The efficiency of the machine is correspondingly high. The current flowing in the demagnetisation winding is opposite to that of the current previously flowing in the stator winding that has been switched off; however, since the demagnetisation winding is oppositely-wound, a magnetic field is nevertheless obtained in the correct direction.

Such an arrangement is particularly suitable for motors with three-phase stator windings and a squirrel-cage rotor. If the stator windings are operated cyclically and a rotary field is therefore produced, this rotary field is not hindered but rather supported by the demagnetisation windings during switching over.

There is good use of the available space if the stator grooves contain three stator windings each offset by 120° and each consisting of two segments offset by 180°, and corresponding demagnetisation windings.

It is favourable if the semi-conductor switching elements are controllable so that only one stator winding is energised at a time and, on switching one stator winding off, the next one is switched on simultaneously. In a three-phase motor this means that each stator winding is cyclically switched on for a period of 120°. In this manner of operation the energy of each magnetic field that is to be reduced is available for building up a different magnetic field. However, the period of the magnetic flux associated with each phase extends beyond 120° because of the effect of the demagnetisation winding, so that one obtains a feed approximating an alternating current with 180° half waves. Further, when using normal thyristors as the controllable semi-conductor switching elements, one can employ very simple known extinguishing circuits in which each newly ignited thyristor extinguishes the previously ignited thyristor. However, different switching-on times can also be achieved with the aid of other extinguishing circuits or other switching elements such as GTO thyristors or transistors.

It is particularly favourable if the stator winding and associated demagnetisation winding are double wound. This achieves a very intense inductive coupling.

The winding ratio between the stator winding and associated demagnetisation winding should be 1:1. This limits the voltage at the semi-conductor switching elements to twice the DC supply voltage.

The demagnetisation winding can be of thinner wire than the stator winding. This space-saving feature is possible because the mean value of the current in the demagnetisation winding is less than the mean value of the operating current of a stator winding.

A particularly simple circuit is obtained if one end of each stator winding and one end of the associated demagnetisation winding are interconnected and a common lead is led out at the DC terminal.

The invention will now be described in more detail with reference to a preferred example illustrated in the drawing, wherein.

Figure 1:
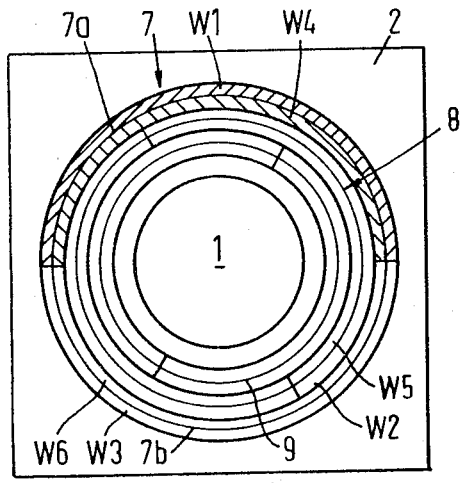
FIG. 1 is a diagrammatic representation of a three-phase motor according to the invention.

The electric motor of FIG. 1 has a squirrel-cage rotor 1. Grooves (not shown) of a stator 2 contain three like double pole winding arrangements 7, 8 and 9 offset from each other by 120° and in each case consisting of two segments, e.g. 7a and 7b, offset from each other by 180°. Each winding arrangement consists of a stator winding W1–W3 and a demagnetisation winding W4–W6. Each stator winding and the associated demagnetisation winding are double wound but in opposite senses.

Figure 2:
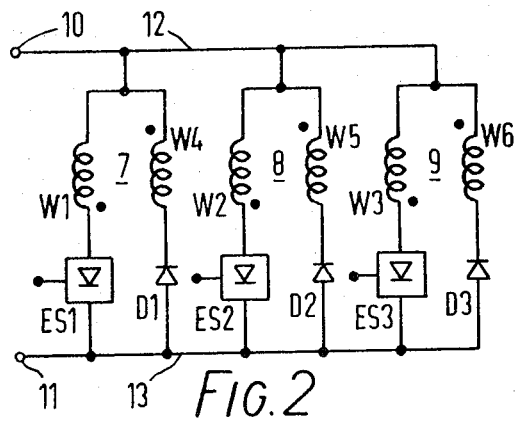
FIG. 2 shows the circuit of this motor.
Figure 5:
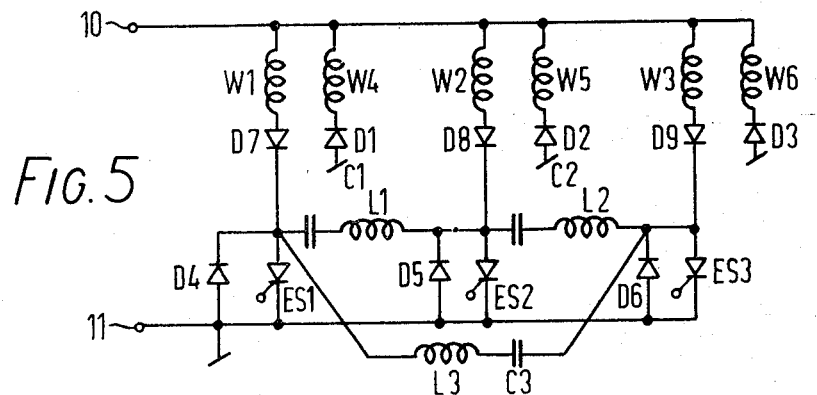
FIG. 5 is a practical example of the FIG. 2 circuit.

FIG. 2 shows that each stator winding is in series with a semi-conductor switching element ES1–ES3. The semi-conductor switching elements have a control input to which control pulses can be applied to bring the semi-conductor switching elements to the conductive state. If transistors are used, the base is used as the control connection. If thyristors are employed, the gate serves as the control connection. If no GTO (gate turn off) thyristors are used, an extinguishing circuit must also be provided for which one example is shown in FIG. 5. The demagnetisation windings W4–W6 are in series with a respective freerunning diode D1–D3. Provision is also made for two DC voltage terminals 10 and 11 with associated supply conductors 12 and 13 of which the latter is earthed. All first series circuits consisting of one stator winding W1–W3 and the associated semi-conductor switching element ES1–ES3 are connected in parallel with each other to the supply conductors 12, 13. The second series circuits consisting of the demagnetisation windings W4–W6 and the associated free-running diodes D1–D3 are in parallel wih the first series circuits.

Figure 3:
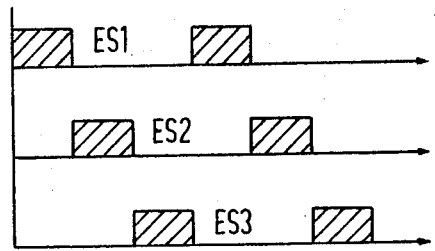
FIG. 3 is a diagram showing the control pulses for the semi-conductor switching elements.

FIG. 3 shows the control pulses which are applied to the control connections of the three semi-conductor switching elements ES1–ES3. They each have a period of 120° el and occur successively and cyclically at the three semi-conductor switching elements so that the three stator windings W1–W3 are successively supplied with current.

Figure 4:
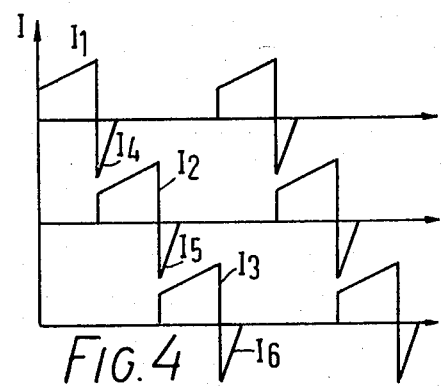
FIG. 4 is a graph of the currents in the three stator windings.

By reason of these conditions, the following manner of operation is obtained. It is assumed that the energised stator winding W1 is switched off and the stator winding W2 is switched on. By reason of switching off the stator winding W1, a voltage is produced in the demagnetisation winding W4 which causes a current to flow predominantly through the stator winding W2, the associated semi-conductor switching element ES2, the free-running diode D1 and the demagnetisation winding W4 and to a small extent possibly also back to the voltage source. This leads to a rapid reduction of the magnetic field associated with the windings W1 and W4. The energy that is thereby released assists the build-up of the new magnetic field produced by the stator winding W2 that has been switched on. This is repeated every 120° el. The winding currents shown in FIG. 4 therefore flow in the windings, namely the currents $I_1$, $I_2$ and $I_3$ in the stator windings W1–W3 and the currents $I_4$, $I_5$, $I_6$ in the demagnetisation windings W4–W6.

FIG. 5 shows the FIG. 2 components in which the semi-conductor switching elements are in the form of thyristors which extinguish when passing through zero. For extinguishes purposes, an extinguishing condenser C1, C2 or C3 and a swing-over choke L1, L2 or L3 is connected between every two branches. Each thyristor is bridged by an oppositely poled diode D4, D5 or D6. In addition, blocking diodes D7, D8 or D9 are in series with the stator windings W1–W3. When the thyristor ES1 is conductive, the condenser C1 is correspondingly charged. If the thyristor ES2 is now ignited, an extinguishing current flows through this thyristor and the diode D4 so that a zero passage is forced to exist at the thyristor ES1 and the latter blocks. Similarly, the other thyristors are likewise extinguished when the respective following thyristor is switched on. The swing-over chokes serve to ensure fullest possible charging of the condensers without excessive post-charging.

Although the additional windings involve additional expense, this is compensated by the fact that the motor can be made smaller because of the considerably improved efficiency in relation to the remaining copper and iron expense. The important advantage therefore resides in the operating savings which are particularly noticeable where only a limited DC power is available, e.g. in battery-operated washing machines, refrigeration compressors or blowers.

The principle as described can also be applied to motors with a different number of poles and/or stator windings and with differently constructed rotors.

What is claimed is:

1. A motor of the type energized by a DC voltage, comprising, a plurality of poles and a like number of parallel subcircuits for said poles, each of said poles having operating and demagnetizing coils oppositely wound and inductively coupled, each of said subcircuits having first and second parallel arranged series circuits, each of said first series circuits including the corresponding one of said operating coils and a controllable switching element, and each of said second series circuits having only passive elements including the corresponding one of said demagnetizing coils and diode means poled oppositely of said switching element.

2. A motor according to claim 1, characterized in that said motor has three-phase windings and a squirrel-cage rotor.

3. A motor according to claim 2, characterized by a stator and stator grooves containing said stator each offset by 120° and each having two segments offset by 180°.

4. A motor according to claim 1 characterized in that said switching elements are controllable so that only one of said operating coils is energized at a time and on switching one operating coil off the next one is switched on simultaneously.

5. A motor according to claim 1 characterized in that each of said operating coils and an associated one of said demagnetization coils are double wound.

6. A motor according to claim 1 characterized in that the winding ratio between each of said operating coils and the associated one of said demagnetizing coils is 1:1.

7. A motor according to claim 1 characterized in that each said demagnetizing coils is of thinner wire than the associated one of operating coils.

8. A motor according to claim 1 characterized in that one end of each of said operating coils and one end of the associated one of said demagnetizing coils are connected to each other and to a DC terminal.

* * * * *